United States Patent
Horowitz

(10) Patent No.: US 6,643,797 B1
(45) Date of Patent: Nov. 4, 2003

(54) SINGLE I/O SESSION TO COMMIT A SINGLE TRANSACTION

(75) Inventor: Amnon I. Horowitz, Yaakov (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/461,691

(22) Filed: Dec. 14, 1999

(51) Int. Cl.⁷ .................................................. G06F 11/00
(52) U.S. Cl. ............................ 714/20; 714/15; 714/16
(58) Field of Search ............................ 714/15, 16, 18, 714/20; 709/101

(56) References Cited

U.S. PATENT DOCUMENTS

| | | | | |
|---|---|---|---|---|
| 4,926,325 A | * | 5/1990 | Benton et al. ................. | 705/39 |
| 5,613,060 A | * | 3/1997 | Britton et al. ............... | 709/100 |
| 5,875,291 A | * | 2/1999 | Fox ............................. | 707/200 |
| 5,963,961 A | * | 10/1999 | Cannon et al. ............. | 707/200 |
| 6,021,414 A | * | 2/2000 | Fuller .......................... | 707/200 |
| 6,085,200 A | * | 7/2000 | Hill et al. .................... | 707/202 |

OTHER PUBLICATIONS

W. Richard Stevens, TCP/IP Illustrated vol. 1: The Protocols, 1994, Addison–Wesley, pp. 23 and 225.*
Instant/Web Online Computer Dictionary "checksum".*
David Platt, More About Transactions, Byte.com (www.byte.com), Dec. 27, 1999.
Phillip A. Bernstein, Eric Newcomer, Principles of Transaction Processing, chapters 1 and 5.10 (ISBN 1–55860–415–4), 1997.

* cited by examiner

Primary Examiner—Robert Beausoliel
Assistant Examiner—Marc Duncan
(74) Attorney, Agent, or Firm—Leydig, Voit & Mayer, Ltd

(57) ABSTRACT

Utilizing only a single input/output (I/O) session to commit a single message transaction to a non-volatile storage within a message transaction system is disclosed. In one embodiment, a method first determines an error detection value, such as a checksum, for a single transaction. The single transaction and the value are written to the non-volatile storage in only a single I/O session. The single transaction is committed upon the successful writing of the transaction and the error detection value to the storage. Upon recovery from a system failure, the error detection value for the transaction is redetermined; if it does not match the value as has been stored to the storage, then the transaction is aborted. Otherwise, the transaction has been committed.

22 Claims, 3 Drawing Sheets

SINGLE I/O SESSION TO COMMIT A SINGLE TRANSACTION

FIELD OF THE INVENTION

This invention relates generally to message transaction systems, and more particularly to utilizing only a single input/output (I/O) session to commit a single transaction.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A message transaction is an activity or a request, such as an order, a purchase, a change, or an addition to a database of information. Transactions usually update one or more files on a non-volatile storage such as a hard disk drive, and thus can serve as both an audit trail and a history for future analyses.

Message transaction systems can be online or offline. Online systems are also referred to as real-time systems, where transactions are processed and the appropriate files updated as soon as transactions are entered or received. Typically, confirmations are then returned to the sender. Thus, for online systems, usually a single message transaction is processed at a time. Offline systems, by comparison, do not process transactions as soon as they are entered or received. Rather, a number of message transactions are processed as a batch—for example, at the end of the business day, once a week, etc. Because organizations increasingly need to keep their data timely all of the time, they are more and more resorting to online message transaction systems.

A single message transaction is considered committed when the transaction has been completely processed. An issue is raised, therefore, when the system crashes while a message transactions is being processed. Upon recovery, it is important to determine whether the processing of the entire message transaction has been completed, such that it has been committed. If the single transaction has been committed, then usually nothing more needs to be done with respect to this transaction, and the system can proceed with processing other transactions. However, if the transaction has been only partly processed, then the transaction has to be aborted, such that the entity that had submitted the message will need to resubmit the message. This helps to ensure that each transaction is atomic.

A difficulty lies in determining after a system crash whether the transaction has only been partly processed, such that it has not been committed and the transaction needs to be aborted, or completely processed, such that the transaction has been committed. A common approach is to utilize two input/output (I/O) sessions. The transaction data that moves the transaction from a non-committed state to a committed state is first written to the non-volatile storage (such as a hard disk drive), in a first I/O session. A second I/O session is then instituted only after the first I/O session is complete, noting the fact that the first I/O session has been completed. Thus, on recovery from a crash, the message transaction system aborts all transactions for which the first I/O session appears, but the second I/O session does not, assuming that the first I/O session may not have been completed.

However, this is an expensive process from a performance perspective. Multiple I/O sessions are required to commit a single transaction to non-volatile storage. For large-scale systems processing millions of transactions on a global basis, the performance penalty resulting from the two-I/O session approach can be substantial. For this and other reasons, therefore, there is a need for the present invention.

SUMMARY OF THE INVENTION

The invention relates to utilizing only a single input/output (I/O) session to commit a single message transaction to a non-volatile storage within a message transaction system. In one embodiment, a method first determines an error detection value, such as a checksum, for a single transaction. The single transaction and the error detection value are written to the non-volatile storage, such as a hard disk drive, in only a single I/O session. Thus, the single transaction is committed upon the successful writing of the single transaction and the error detection value to the non-volatile storage.

In one embodiment, if a system failure results during the processing of the transaction, then upon recovery, the single transaction and the error detection value are read from the non-volatile storage. The error detection value is redetermined from the transaction as read from the storage; if the error detection value as redetermined varies from the error detection value as read from the storage, then this means that the transaction has not been completely processed, and it is aborted. Otherwise, if the redetermined value matches the read value, then this means that the single transaction has been committed.

Embodiments of the invention provide for advantages not found within the prior art. Significantly, only a single I/O session is required to commit a single message transaction to a non-volatile storage, while still ensuring that detection of whether the transaction has been completely processed, and therefore committed, is possible upon recovery from a system failure. This is as compared to the prior art approach, which requires two I/O sessions to allow for detection of complete transaction processing upon recovery from a system failure. Thus, embodiments of the invention allow for gains in transaction processing performance to be realized.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced.

These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
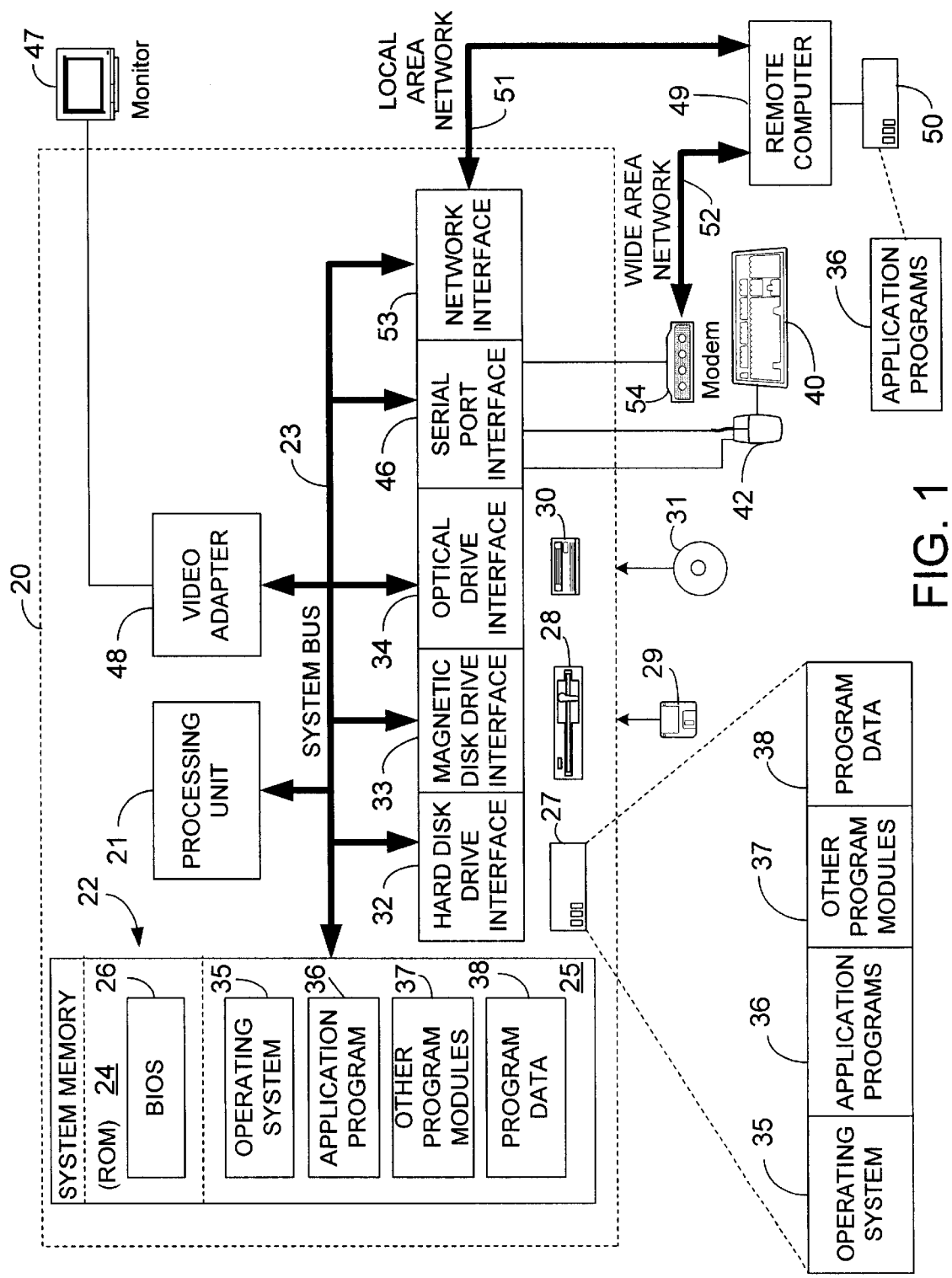
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20 including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Methods

In this section of the detailed description, methods according to varying embodiments of the invention are presented. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer. The methods are for committing a single transaction of a message transaction system, such as a system as has been described in the background section. The invention is not limited to any particular type of message transaction system.

Figure 2:
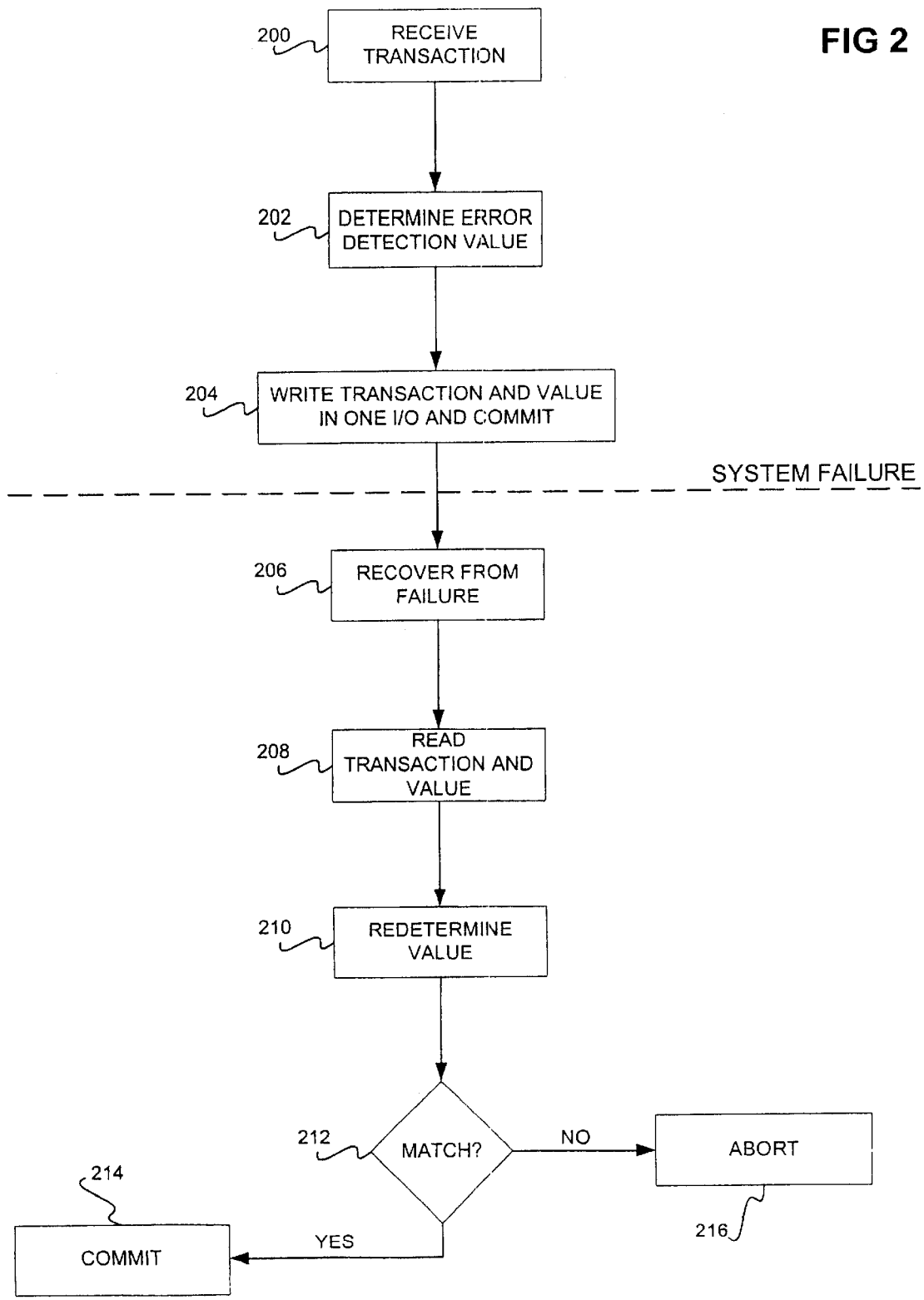
FIG. 2 is a flowchart of a method according to an embodiment of the invention; and, FIG. 3 is a diagram of a system according to an embodiment of the invention.

Referring to FIG. 2, a flowchart of a method according to an embodiment is shown. In 200, a transaction is received, for example, from a message queue where transactions are held until they can be processed, in a first-in, first-out (FIFO) basis, although the invention is not so limited. The type of transaction is also not limited by the invention; any type of transaction that can be utilized within a message transaction system is amenable to embodiments of the invention. The invention relates to transactions that are committed on an individual basis, as opposed to transactions that are committed on a batch basis.

In 202, an error detection value is determined for the single transaction received in 200. In one embodiment, the error detection value is a checksum. As known within the art, a checksum is a value used to ensure data is stored or transmitted without error. It is created by calculating the binary values in a block of data using a predetermined algorithm and storing the results with the data. When the data is retrieved from disk or received at the other end of a network, a new checksum can then be computed and matched against the existing checksum. A non-match indicates an error. Embodiments of the invention are not limited to an error detection value that is a checksum, however.

In 204, the single transaction and the error detection value are written to a non-volatile storage of the message transaction system, in only a single input/output (I/O) session. By the single transaction being written to the storage, it is non-restrictively meant that the data of the transaction necessary to change the state of the transaction from a non-committed to a committed state is written to the storage. By a single I/O session, it is non-restrictively meant that a single write command, for example, is used to write the transaction and the value to the storage. That is, only a singular transfer of data is accomplished to the storage, such that the single transfer encompasses both the transaction and the error detection value. In one embodiment, the storage can be a hard disk drive, as known within the art, although the invention itself is not so limited. Upon the successful completion of the I/O session, the transaction is thus committed.

However, during the single I/O session, a system failure may result, such as a system crash, a loss of power to the system, etc. This is represented by the dotted line in FIG. 2. The system failure may also occur while the transaction and the error detection value are being written in 204, or after they have been written in 204, or at other times during the transaction. In 206, the system recovers from the failure. For example, the system may have to be rebooted, or otherwise restarted. Part of the recovery process is detecting and removing any transaction that is in a non-committed state, and aborting such transactions.

Therefore, in 208, the single transaction and the error detection value as they have been stored to the non-volatile storage in 204 are read from the storage. Where the system failure occurred during the I/O session itself, this likely means that not all the data of the transaction was written to the storage. In 210, the error detection value is redetermined based on the transaction as read from the storage in 208. Thus, if the transaction was not completely processed—that is, the data to transform its state from non-committed to committed was not completely written to the storage—then a comparison of the value as redetermined and the value as read will yield the error detection value as redetermined in 210 not matching the error detection value that was previously determined in 202, and read from the storage in 208, since they have been determined based on different data.

If a match does not occur then, the method proceeds from 212 (where the comparison took place) to 216, where the transaction is aborted. However, if a match does occur, then the method proceeds instead from 212 (where the comparison took place) to 214, where the transaction is considered to have been committed. Thus, detection of whether a transaction has been completely processed or not, and therefore whether the transaction has been committed or not, is afforded by the method of FIG. 2, while using only a single I/O session to write the data to the non-volatile storage.

It is noted that in 204, in one embodiment, although the invention itself is not so limited, the error detection value is written to the storage prior to the transaction itself, but still within a single I/O session. This ensures that at least the error detection value will have been stored on the storage upon a system failure, such that upon recovery, the error detection value is substantially always retrievable from the storage, even if any of the data of the transaction itself is not. Thus, there will be an error detection value read from the storage that can be compared to a redetermined value in 212.

However, in another embodiment, the error detection value is not written to the storage until after the transaction itself, but still within a single I/O session. In this embodiment, there is potential for the error detection value not having yet been written to the storage upon a system failure, such that upon recovery, the error detection value may not be retrievable from the storage. In such an instance, if the actual value determined in 202 is not written to the storage in 204, such that it cannot be read therefrom in 208, a constructive error detection value of a predetermined value (such as zero) is assumed to have been read from the storage, such that a comparison can still take place in 212. However, the invention is not itself so limited to this approach.

Systems

Figure 3:
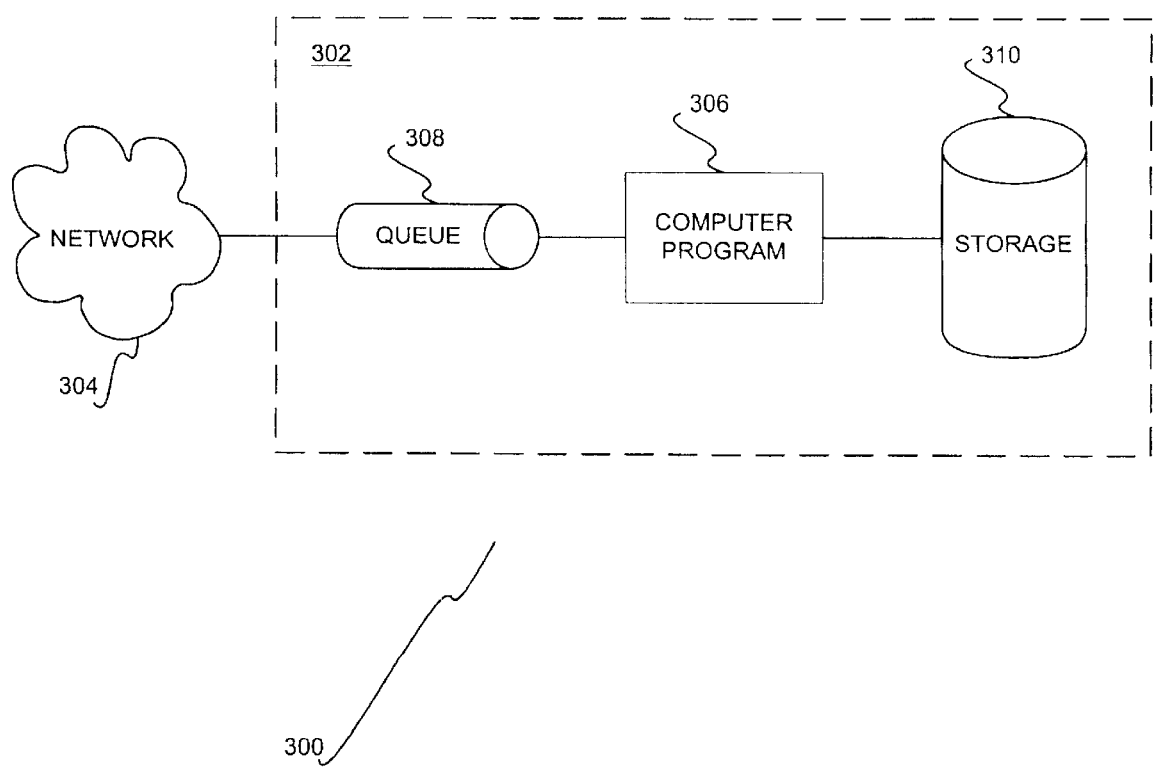

In this section of the detailed description, systems according to varying embodiments of the invention are described. Referring to FIG. 3, a diagram of a system according to a specific embodiment is shown. The system 300 includes a computer 302 and a network 304. The computer 302 is in one embodiment a server computer used within a transaction message system and that is able to commit transactions on a singular basis, in addition to or in lieu of a batch basis. In one embodiment, the computer 302 is a computer such as has been described in conjunction with FIG. 1 in a previous section of the detailed description. The network 304 can be one or more of: the Internet, an intranet, an extranet, a local-area network (LAN), a wide-area network (WAN), etc.; the invention is not limited to a particular type or types of networks.

The computer 302 in one embodiment includes a message queue 308 communicatively coupled to the network 304, a computer program 306 communicatively coupled to the message queue 308, and a non-volatile storage 310 communicatively coupled to the program 306. The message queue 308 is in one embodiment a first-in, first-out (FIFO) queue, such that message transactions are received into the queue 308 for processing by the program 306 from the network 304. The non-volatile storage 310 is in one embodiment a hard disk drive, and is the storage to which transactions are committed by the program 306. In one embodiment, the program 306 is executed from a processor of the computer 302 from a computer-readable medium, such as a memory, thereof, where the processor and the medium are not shown in FIG. 3, although the invention itself is not so limited.

The program 306 is designed to determine an error detection value, such as a checksum, for a single message transaction received from the network 304 through the queue 308, and to write the single transaction and the error detection value to the storage 310 in only a single I/O session to commit the transaction, in one embodiment as has been described in the preceding section of the detailed description. Thus, the program 306 is in one embodiment designed to commit the transaction upon successfully writing the single transaction and the error detection value to the storage 310. Furthermore, the program 306 is in one embodiment designed to commit the transaction after recovery from a system failure only if redetermining the error detection value yields an identical value to the error detection value as was stored on and as is retrieved from the storage 310. In one embodiment, the program 306 can be considered as a means for performing one or more of these functions, although the invention is not so limited.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A computer-implemented method for committing a single transaction of a message transaction system comprising:

determining an error detection value for the single transaction;

writing the single transaction first and the error detection value second to a non-volatile storage in a single input/output session;

recovering from a system failure;

reading the single transaction and the error detection value from the non-volatile storage;

redetermining the error detection value;

comparing the error detection value as redetermined with the error detection value as read from non-volatile storage;

upon the error detection value as redetermined matching the error detection value as read from the non-volatile storage, committing the single transaction;

otherwise, aborting the single transaction; and wherein the single transaction occurs in a distributed computing environment independent of a particular computer network transport protocol.

2. The method of claim 1 further initially comprising receiving the single transaction in a queue.

3. The method of claim 2, wherein the queue resides in non-volatile storage.

4. The method of claim 1, wherein the error detection value comprises a checksum value of the single transaction.

5. The method of claim 1, wherein the non-volatile storage comprises a hard disk drive.

6. A computer-readable medium having computer-executable instructions for implementing the method of claim 1.

7. The method of claim 1, wherein the single transaction is a computer-implemented financial transaction.

8. A computer-implemented method for committing a single transaction of a message transaction system comprising:

determining an error detection value for the single transaction;

writing the single transaction first and the error detection value second to a non-volatile storage in a single input/output session;

recovering from a system failure;

reading the single transaction and the error detection value from the non-volatile storage;

redetermining the error detection value;

comparing the error detection value as redetermined with the error detection value as read from non-volatile storage;

upon the error detection value as redetermined matching the error detection value as read from the non-volatile storage, committing the single transaction;

otherwise, aborting the single transaction; and wherein committing the single transaction comprises later determining that the single transaction was committed if the error detection value as read from the non-volatile storage matches an error detection value as redetermined from the single transaction as read from the non-volatile storage.

9. A computer-readable medium having computer-executable instructions for implementing the method of claim 8.

10. A computer-implemented method for committing a single transaction of a message transaction system comprising:
- determining an error detection value for the single transaction;
- writing the single transaction first and the error detection value second to a non-volatile storage in a single input/output session;
- recovering from a system failure;
- reading the single transaction and the error detection value from the non-volatile storage;
- redetermining the error detection value;
- comparing the error detection value as redetermined with the error detection value as read from non-volatile storage;
- upon the error detection value as redetermined matching the error detection value as read from the non-volatile storage, committing the single transaction;
- otherwise, aborting the single transaction; and
- wherein aborting the single transaction comprises later determining that the single transaction was not committed if the error detection value as read from the non-volatile storage does not match an error detection value as redetermined from the single transaction as read from the non-volatile storage.

11. A computer-readable medium having computer-executable instructions for implementing the method of claim 10.

12. A computer-implemented method for committing a single transaction of a message transaction system comprising:
- determining an error detection value for the single transaction;
- writing the error detection value first and the single transaction second to a non-volatile storage in a single input/output session;
- recovering from a system failure;
- reading the single transaction and the error detection value from the non-volatile storage;
- redetermining the error detection value;
- comparing the error detection value as redetermined with the error detection value as read from non-volatile storage;
- upon the error detection value as redetermined matching the error detection value as read from the non-volatile storage, committing the single transaction;
- otherwise, aborting the single transaction; and
- wherein the single transaction occurs in a distributed computing environment independent of a particular computer networking mechanism.

13. The method of claim 12 further initially comprising receiving the single transaction in a queue.

14. The method of claim 13, wherein the queue resides in non-volatile storage.

15. The method of claim 12, wherein the error detection value comprises a checksum value of the single transaction.

16. The method of claim 12, wherein the non-volatile storage comprises a hard disk drive.

17. A computer-readable medium having computer-executable instructions for performing the method of claim 12.

18. The method of claim 12, wherein the single transaction is a computer-implemented financial transaction.

19. A computer-implemented method for committing a single transaction of a message transaction system comprising;
- determining an error detection value for the single transaction;
- writing the error detection value first and the single transaction second to a non-volatile storage in a single input/output session;
- recovering from a system failure;
- reading the single transaction and the error detection value from the non-volatile storage;
- redetermining the error detection value;
- comparing the error detection value as redetermined with the error detection value as read from non-volatile storage;
- upon the error detection value as redetermined matching the error detection value as read from the non-volatile storage, committing the single transaction;
- otherwise, aborting the single transaction; and
- wherein committing the single transaction comprises later determining that the single transaction was committed if the error detection value as read from the non-volatile storage matches an error detection value as redetermined from the single transaction as read from the non-volatile storage.

20. A computer-readable medium having computer-executable instructions for implementing the method of claim 19.

21. A computer-implemented method for committing a single transaction of a message transaction system comprising:
- determining an error detection value for the single transaction;
- writting the error detection value first and the single transaction second to a non-volatile storage in a single input/output session;
- recovering from a system failure;
- reading the single transaction and the error detection value from the non-volatile storage;
- redetermining the error detection value;
- comparing the error detection value as redetermined with the error detection, value as read from non-volatile storage;
- upon the error detection value as redetermined matching the error detection value as read from the non-volatile storage, committing the single transaction;
- otherwise, aborting the single transaction; and
- wherein aborting the single transaction comprises later determining that the single transaction was not committed if the error detection value as read from the non-volatile storage does not match an error detection value as redetermined from the single transaction as read from the non-volatile storage.

22. A computer-readable medium having computer-executable instructions for implementing the method of claim 21.

* * * * *